L. BICKEL
Corn-Cutting Implement.

No. 203,315. Patented May 7, 1878.

Witnesses:
John Meurman
J. J. Hall

Inventor:
Louis Bickel.
by Humphrey & Stuart
Atty s.

UNITED STATES PATENT OFFICE.

LOUIS BICKEL, OF AKRON, OHIO.

IMPROVEMENT IN CORN-CUTTING IMPLEMENTS.

Specification forming part of Letters Patent No. 203,315, dated May 7, 1878; application filed February 11, 1878.

*To all whom it may concern:*

Be it known that I, LOUIS BICKEL, of Akron, in the county of Summit and State of Ohio, have invented a new and useful Improvement in Corn-Cutters, of which the following is a specification:

This invention has relation to that class of corn-cutters which are adapted to be attached to and operated by the foot. These, as far as I have been able to ascertain, have either been constructed with the blade-edge downward and standing at right angles with the foot, or edge upward and parallel with the foot.

The former is objectionable by reason of its tendency, when in use, to turn backward, thereby twisting the foot and ankle uncomfortably, while the other requires a lifting movement of the foot to sever the stalks, which movement is particularly fatiguing.

The object of my invention is to overcome these objections.

Figures 1, 3:
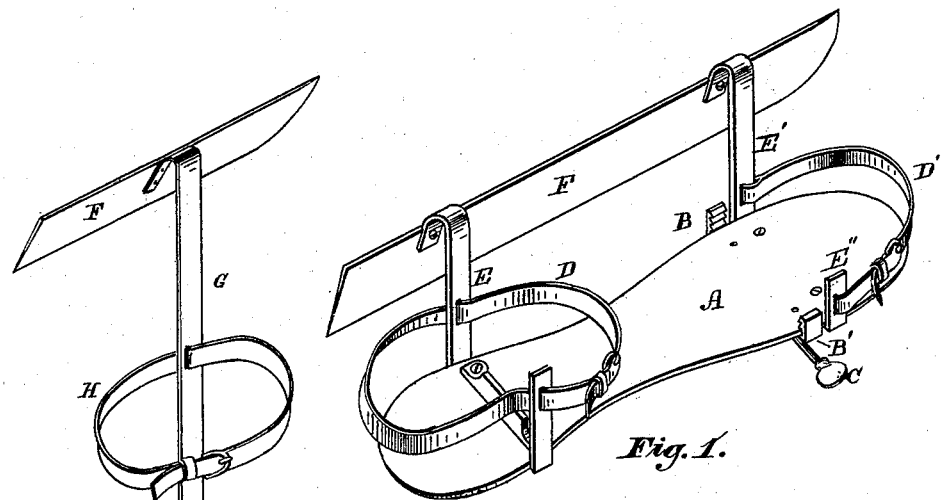
Figure 2:
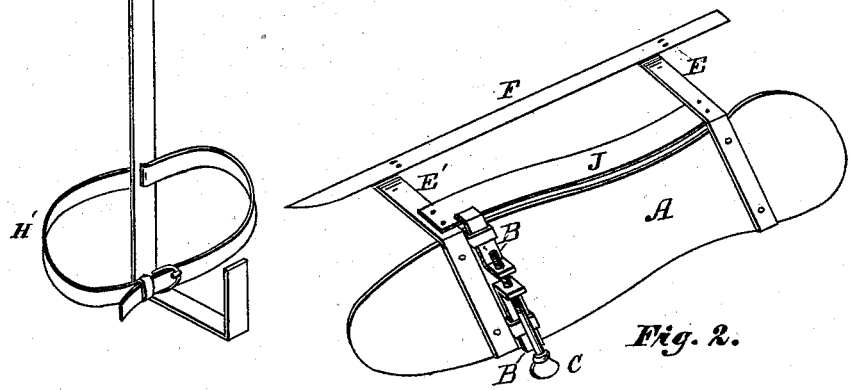

My invention will be readily understood by reference to the accompanying drawings, wherein Figures 1 and 2 represent perspective views from different directions of my improved corn-cutter as ordinarily constructed, and Fig. 3 a similar view of a knife and attachments for cutting the stalks at a greater distance above the ground.

A is a metallic sole, adapted to be fastened to the boot of the operator by means of the clamps B B', operated by the screw C, and also by the straps D D'.

Attached to the sole A are two uprights, E E', curved outward and over at their upper ends, to which is attached the knife F. This knife is arranged with its edge projecting outward at an angle with the uprights E E', so that as the foot is pressed down it will sever the stalk of corn with a diagonal cut.

In operation, the sole A is attached to the right foot, the standing corn grasped with the hands, and the stalks severed by a downward stroke of the foot.

Instead of the clamps B B', the inside surface of the upright E' may be roughened and the upright E'' made movable, so as to be operated by the screw C.

When it is desired to cut the corn at a greater distance above the ground, the knife may be attached to the upper end of a bar, G, Fig. 3, the lower end whereof terminates in a stirrup, and the whole attached to the leg by the straps H H'.

It may be found advantageous to attach a shield to the instrument, as shown by J, Fig. 2, to protect the foot when making the downward stroke.

I claim as my invention—

1. A knife for cutting corn, attached by suitable connections, such substantially as shown, to a sole, by which it may be fastened to the foot, and lying parallel with the foot, with its edge projecting outward and downward, substantially as shown.

2. The combination of the knife F, sole A, and uprights E E', all arranged and operating substantially as and for the purpose hereinbefore set forth.

3. The shield J, in combination with the knife F, substantially as and for the purpose specified.

LOUIS BICKEL.

Witnesses:
C. P. HUMPHREY,
E. W. STUART.